United States Patent [19]

Alexandrov et al.

[11] 4,035,266

[45] July 12, 1977

[54] METHOD OF SYNTHESIS OF METAL CHROMITES

[76] Inventors: Vladimir Ilich Alexandrov, ulitsa Ostrovityanova, 31, kv. 281; Vladimir Grigorievich Gordon, 13 Parkovaya ulitsa, 31, korpus 1, kv. 83, both of Moscow; Ernest Nikolaevich Muraviev, ulitsa Popova, 10, kv. 36, Fryazino Moskovskoi oblasti; Vyacheslav Vasilievich Osiko, ulitsa Vavilova, 48, kv. 63, Moscow; Alexandr Mikhailovich Prokhorov, ulitsa Gubkina, 4, kv. 85, Moscow; Eduard Georgievich Spiridonov, Preobrazhensky val, 24a, kv. 1, Moscow; Vladimir Mikhailovich Tatarintsev, Leninsky prospekt, 45, kv. 112, Moscow, all of U.S.S.R.

[21] Appl. No.: 529,212

[22] Filed: Dec. 3, 1974

[51] Int. Cl.$^2$ .............. H01B 1/02; H01B 1/08

[52] U.S. Cl. .............. 252/512; 252/521; 106/66

[58] Field of Search .......... 252/521, 512; 106/66; 310/11; 423/596

[56] References Cited

U.S. PATENT DOCUMENTS

| | | | |
|---|---|---|---|
| 3,475,352 | 10/1969 | Barbier et al. | 106/66 X |
| 3,490,067 | 1/1970 | Foëx | 252/521 |

Primary Examiner—Benjamin R. Padgett
Assistant Examiner—E. Suzanne Parr
Attorney, Agent, or Firm—Fleit & Jacobson

[57] ABSTRACT

A method of synthesizing metal chromites comprising melting metal oxides including chromium oxide in an equimolar ratio. The oxides are melted under the action of a high-frequency electric field with the addition to the metal oxides of an electrically conductive material having an electric resistivity of no more than 10 Ohm.cm at 20° C and in an amount of at least 0.05% by weight.

8 Claims, No Drawings

METHOD OF SYNTHESIS OF METAL CHROMITES

The present invention relates to the manufacture of refractory materials, and in particular to a method of synthesizing metal chromites.

Metal chromites, in particular chromites of rare-earth elements and yttrium represent a new type of oxide refractory materials and are characterized by a high melting point (2300–2500° C) and low electric resistivity over the entire temperature range (lanthanum chromite has an electric resistivity of about $10^3$ Ohm.cm at 20° C and 1 Ohm.cm at 1400° C).

The method according to the invention can be employed for synthesizing not only chromites of rare-earth elements, but also chromites of alkali-earth metals, iron, titanium and other elements, as well as other refractory materials containing chromium oxide as a component thereof.

This method may be used in producing materials for making electrodes for channels of MHD generators, fuel cell cathodes and their heating means for a working temperature in an oxidizing atmosphere of 1800°–2000° C.

Several methods of synthesis of metal chromites are known.

Thus, it is known to produce chromites of rare-earth elements by crystallization from a melt of an equimolar mixture of rare-earth element oxides and chromium oxide with the addition of bismuth oxide. Bismuth oxide is added with a view to lowering the melting point of the mixture to 1000°–1200° C. When heated in air at 1000°–1200° C in a platinum vessel, fine crystals (10–100 mu) of chromite of a rare-earth element grow from the melt. After the cooling of the melt, bismuth oxide is converted into a soluble state by treating it with diluted inorganic acids.

It is also known to obtain chromites of rare-earth elements by crystallization from a melt of an equimolar mixture of nitrates of chromium and a rare-earth element at 1200° C in the air, or equimolar mixture of chloride of a rare-earth metal and potassium chromate.

Metal chromites may also be produced by precipitating equimolar mixtures of hydroxides of rare-earth elements and chromium from solutions with subsequent calcination of the precipitate at 800°–1000° C.

The common disadvantage of the above-described methods resides in that they involve a multiplicity of independent steps, are time-consuming and have a low productivity.

A more efficient method resides in synthesizing metal chromites in an electric arc furnace, this method comprising the melting of a compression moulded briquette of an equimolar mixture of oxides of a required metal and chromium in an electric arc in air.

The basic disadvantage of this method consists in that the synthesized metal chromite is contaminated with the material of the electrodes.

It is also known to sythesize metal chromites by melting an equimolar mixture of metal oxides including chromium oxide in a sun-powered furnace. The solar energy flux is focused by means of a spherical reflector of a diameter of 6–20 m at a spot of 5–10 mm diameter. The temperature in the spot may attain 3000° C and more.

An equimolar mixture of powders of oxides of a desired metal and chromium is placed in a rotatable water-chilled container. The focus of the reflector is located at the center of the container so that the melting of the mixture of oxides in the container begins at the central part thereof and propagates to the peripheral portions with the mixture being heated through until the temperature remains higher than the melting point of the chromites being synthesized.

In addition to the requirements imposed on the weather conditions and the diameter of the reflector, this method is basically deficient, similarly to the method involving the melting in an electric arc furnace, in that the energy (either solar energy or energy of electric arc) is supplied to the melt by means of an indirect heating through the surface of the melt thereby resulting in the appearance of temperature gradients, in incomplete synthesis and impossibility of heating through large volumes of melt associated with such gradients.

Furthermore, the continuous process of synthesis of metal chromites cannot be conducted either in an electric arc furnace or in a sun-powered furnace.

It is an object of the invention to provide a highly productive method of synthesis of metal chromites.

Another object of the invention is to provide a continuous process for synthesizing metal chromites.

Still another object of the invention is to provide a method enabling the production of highly pure metal chromites.

With these and other objects in view, the invention consists in the provision of a method of synthesizing metal chromites by melting metal oxides, including chromium oxides, the metal oxides being used in an equimolar ratio, under the action of a high-frequency field with the addition to the metal oxides of an electrically conductive material having an electric resistivity of no more than 10 Ohm.cm at 20° C used in an amount of at least 0.05% by weight.

Since the additive comprising an electrically conductive material absorbs the energy of the high-frequency field so as to heat and melt it, it will heat the adjacent zones of the charge at temperatures such that they start absorbing the energy of the high-frequency field themselves, and are further heated and melted. There comes a moment when the entire charge is brought to a liquid state.

Since the energy of the high-frequency field is absorbed at every point of the melt, there are no temperature gradients or unreacted zones therein, and a complete homogeneity of the melt is obtained.

The advantage of this method resides in the opportunity of melting in a high-frequency field large volumes of materials. Thus, a high-frequency generator having an output of 50 kW ensures the melting of a material in a volume of about 5 liters.

In addition, the method according to the invention enables the continuous running of the process of synthesizing;

It is advantageous that either oxides of a rare-earth element, or alkali-earth element oxide, or yttrium oxide, or scandium oxide can be melted together with chromium oxide, the electrically conductive material comprising chromium.

An oxide of at least one of rare-earth elements or yttrium and an oxide of at least one of alkali-earth metals are preferably melted with chromium oxide, the electrically conductive material comprising chromium or chromites having a composition identical to that of the chromite being synthesized. Thus a refractory material is obtained having a melting point of 2200°–2400°

C and an electric resistivity of about 10 Ohm.cm at 20° C so that it can be used for making heating elements operating at 1800°–2000° C in an oxidizing atmosphere without preheating in contradistinction to heaters from stabilized zirconium dioxide.

It should be noted that the addition of an electrically conductive material does not contaminate the chromites being synthesized afterwards since it comprises either metals parent to the starting metal oxides or a material having a high electric conductivity which is identical in composition to the chromite being synthesized.

The method of synthesis of metal chromites is carried out in the following manner.

A charge is prepared from an equimolar mixture of powders of metal oxides including chromium oxide. Other oxides may comprise oxides of rare-earth metals, yttrium and scandium oxides, oxides of alkali-earth metals, iron, titanium and the like. The charge is poured into a container composed of a set of water-chilled copper tubes and is then melted in a high-frequency electric field.

Prior to the melting an electrically conductive material is locally added to the mixture in an amount of at least 0.05% by weight of the charge since a smaller quantity cannot ensure the melting of the entire charge.

Electrically conductive materials absorbing the energy of a high-frequency field comprise the materials whose electric resistivity does not exceed 10 Ohm.cm at 20°C, such as all rare-earth elements, metallic chromium, yttrium, as well as chromites of the formula $R_{1-}Me_x CrO_3$ (wherein R is rare-earth element or yttrium, Me — an alkali-earth metal $x=0.02–0.4$).

Since the chromites of the above formula have a low electric resistivity at 20° C (about 10 Ohm.cm), the synthesis is of such chromites may be conducted with the use of an electrically conductive material comprising a chromite identical in composition to the chromite being synthesized and obtained by any other appropriate method.

An electrically conductive material is introduced into the charge prior to the beginning of the initial melting thereof. Where an electrically conductive material comprises metals, they are converted into respective oxides during the melting of the charge in the air. In order to maintain the stoichiometric composition of the resulting metal chromites, excessive quantities of the remaining metal oxides are used in an equimolar ratio with the oxides, which is done as described above during the oxidation of a metal used as electrically conductive material.

The charge is melted in the container in a high-frequency electric field, while cooling the container with water fed into the tubes. A source of high-frequency energy comprises a high-frequency generator having a generation frequency of at least 300 kHz. The energy of high-frequency oscillations from the generator is transmitted to an inductor and is then partially absorbed by the additive of an electrically conductive material locally placed in the charge. The local heating melts a part of the charge in contact with the electrically conductive material (initial melting of the charge).

The molten part of the charge absorbs the energy of high-frequency oscillations from the generator, and the molten zone continues to grow.

As a result a melt of charge is formed in the container, as well as a slag layer of 1.8–2 mm thickness. The layer of slag is formed from the unmelted part of the charge in contact with the walls and bottom of the container.

To carry out the process of synthesis of metal chromites, in a continuous manner, the container bottom is made descendable. Then the lower part of the melt is cooled down when leaving the inductor zone to solidify it, while fresh batches of charge are fed into the melt from the top from a hopper disposed over the container. The speed of descent of the container bottom from the zone of the inductor is generally from 20 to 50 cm/h.

The method according to the invention may be used in producing chromites of rare-earth elements, alkali-earth metals, yttrium, scandium and the like, as well as miscellaneous chromites of rare-earth elements and yttrium with alkali-earth metals.

The invention will be better understood from the following detailed description of specific examples.

EXAMPLE 1

A charge was prepared by mixing powders of chromium oxide in an amount of 3040 g and lanthanum oxide in an amount of 6516 g. The resulting charge was poured into a container. Prior to the melting 10 g (0.1% by weight) of metallic chromium were locally added to the charge (electric resistivity of $10^{-5}$ Ohm.cm.).

32.5 g of lanthanum oxide were added to the charge to correct the composition thereof.

The charge was melted in a high-frequency electric field under cooling of the container with water. A source of electric power comprised a high-frequency generator with a working output of 60 kW at 300 kHz. After the complete melting of the charge the melt surface had a temperature of 2600° C. The mixture was allowed to stay under these conditions for a few minutes, then the generator was deenergized, and the resulting ingot of the metal chromite was withdrawn from the container after cooling down to room temperature.

The electric resistivity of the synthesized lanthanum chromite ($LaCrO_3$) was of $2\times10^3$ Ohm.cm.

EXAMPLE 2

A charge consisted of an equimolar mixture of powders of chromium oxide and calcium oxide used in the following amounts: 6080 g of chromium oxide and 2240 g of calcium oxide.

The resulting charge was poured into a container. Prior to the melting 4 g (0.05% by weight) of metallic chromium were locally added to the charge (electric resistivity of about $10^{-5}$ Ohm.cm at 20° C.) 2.2 g of calcium oxide were added to the charge to correct the composition thereof. The remaining steps were conducted as described in Example 1.

The resistivity of the resulting synthesized calcium chromite ($CaCr_2O_4$) was of $2\times10^2$ Ohm.cm at 20° C.

EXAMPLE 3

A charge consisted of an equimolar mixture of the following powders:
neodymium oxide: 3366 g (25 mol.%)
gadalinium oxide: 3618 g (25 mol.%)
chromium oxide: 3040 g (50 mol.%)

The resulting charge was poured into a container. Prior to the melting 100 g (1% by weight) of metallic chromium were locally added to the charge (electric resistivity of about $10^{-5}$ Ohm.cm at 20° C). 112 g of neodymium oxide and 121 g of gadolinium oxide were added to the charge to correct the composition thereof. The remaining steps were conducted as described in Example 1.

The electric resistivity of the synthesized chromite ($Nd_{0.5}Gd_{0.5}CrO_3$) was of $5 \times 10^4$ Ohm.cm at 20° C, the melting point was 2250° C.

EXAMPLE 4

A charge consisted of an equimolar ratio of the following powders:
calcium oxide: 1120 g (25 mol.%)
strontium oxide: 2072 g (25 mol.%)
chromium oxide: 6080 g (50 mol.%).

The resulting charge was poured into a container. Prior to the melting 180 g (2% by weight) of metallic chromium were locally added to the charge. (50 g of calcium oxide and 92 g of strontium oxide were added to the charge to correct the composition thereof.

The remaining steps were conducted as described in Example 1.

The electric resistivity of the synthesized chromite ($Ca_{0.5}Sr_{0.5}Cr_2O_4$) was of $1.5 \times 10^2$ Ohm.cm at 20°C, the melting point was 2180° C.

EXAMPLE 5

A charge consisted of an equimolar mixture of the following powders:
yttrium oxide: 5650 g
chromium oxide: 3800 g.

The resulting charge was poured into a container. Prior to the melting 95 g (1% by weight) of metallic yttrium were locally added to the charge (electric resistivity of 10 Ohm.cm at 20° C).

81 g of chromium oxide were added to the charge to correct the composition thereof.

The remaining steps were conducted as described in Example 1.

The electric resistivity of the synthesized yttrium chromite ($YCrO_3$) was of $5 \times 10^4$ Ohm.cm at 20° C.

EXAMPLE 6

A charge consisted of an equimolar mixture of the following powders:
scandium oxide: 5520 g
chromium oxide: 6080 g.

The resulting charge was poured into a container. Prior to the melting 58 g (0.5% by weight) of metallic scandium were locally added to the charge (electric resistivity of 10 Ohm.mm at 20° C).

98 g of chromium oxide were added to the charge to correct the composition thereof.

The remaining steps were conducted as described in Example 1.

The electric resistivity of the synthesized scandium chromite ($ScCrO_3$) was of $3 \times 10^4$ Ohm.cm at 20° C.

EXAMPLE 7

A charge consisted of an equimolar mixture of the following powders:
lanthanum oxide: 5860 g (45 mol.%)
calcium oxide: 112 g (5 mol.%)
chromium oxide: 3044 g (50 mol.%).

The resulting charge was poured into a container. Prior to the melting 180 g (2% by weight) of a chromite identical in the composition to the chromite to be synthesized and obtained by the same method were locally added to the charge (electric resistivity of $La0.9Ca0.1CrO3$ was about 10 Ohm.cm at 20°C).

The remaining steps were conducted as described in Example 1.

The melting point of the synthesized chromite was about 2430° C.

EXAMPLE 8

A charge consisted of an equimolar mixture of the following powders:
Samarium oxide: 3480 g (23 mol.%)
yttrium oxide: 2250 g (23 mol.%)
strontium oxide: 310 g (4 mol.%)
chromium oxide: 3495 g (50 mol.%).

The resulting charge was poured into a container. Prior to the melting 95 g (1% by weight) of metallic yttrium were locally added to the charge. 81 g of chromium oxide were added to the charge to correct the composition thereof.

The remaining steps were conducted as described in Example 1.

The electric resistivity of the synthesized chromite ($Sm_{0.46}Y_{0.46}Sr_{0.08}CrO_3$) was of 9.0 Ohm.cm at 20° C, the melting point was 2180° C.

EXAMPLE 9

A charge consisted of an equimolar mixture of the following powders:
lanthanum oxide: 5930 g (45.5 mol.%)
calcium oxide: 34 g (1.5 mol.%)
barium oxide: 82 g (1.5 mol.%)
strontium oxide: 62 g (1.5 mol.%)
chromium oxide: 3043 g (50 mol. %)

The resulting charge was poured into a container. Prior to the melting 274 g (3% by weight) of a chromite identical in composition to the chromite to be synthesized and obtained by the electric-arc melting were locally added to the charge. The electric resistivity of the synthesized chromite ($La_{0.91}Ca_{0.03}Sr_{0.03}Ba_{0.03}CrO_3$) was of 6.0 Ohm.cm at 20° C, the melting point was 2350°C.

EXAMPLE 10

A charge consisted of an equimolar mixture of the following powders:
magnesium oxide: 2015 g
chromium oxide: 7600 g.

The resulting charge was poured into a container. Prior to the melting 5 g (0.5 % by weight) of metallic chromium were locally added to the charge. 1.9 g of magnesium oxide were added to the charge to correct the composition thereof.

The remaining steps were conducted as described in Example 1.

The electric resistivity of the synthesized magnesium chromite ($MgCr_2O_4$) was of $2 \times 10^4$ Ohm.cm at 20° C.

What is claimed is:

1. A method of synthesizing refractory material of metal chromites having a melting point of 2200–2400° C and an electric resistivity of about 10 ohm.cm at 20° C which comprises the steps of:

preparing an equimolar mixture of chromium oxide and at least one oxide of a member selected from the group consisting of rare-earth metals, alkali earth metals, yttrium, scandium, titanium and iron, adding to said mixture at least 0.05% by weight of the mixture a chromite having a composition substantially similar to the chromite being synthesized, and then, subjecting the resulting mixture to a high frequency electric field of at least 300 KHz whereby the mixture is melted.

2. A method of synthesizing a metal chromite comprising preparing an equimolar mixture of chromium oxide and at least one oxide of a member selected from the group consisting of a rare-earth element, an alkali-earth element, yttrium, scandium, iron, and titanium, adding to said mixture an electrically conductive material having an electric resistivity of not more than 10 ohm. cm at 20° C. and selected from the group consisting of a rare-earth element, metallic chromium, metallic yttrium, metallic scandium, and a chromite of the formula $R_{1-x}Me_xCrO_{3-}$ wherein R is a rare-earth element, yttrium or scandium, Me is an alkali-earth metal, and $x$ equals 0.02 to 0.4, said mixture also having added thereto a metallic oxide selected from the group consisting of chromium oxide, yttrium oxide, and scandium oxide when the said electrically conductive material is selected from the group consisting of metallic chromium, metallic yttrium and metallic scandium, respectively, to maintain the stoichiometry of the composition, and then melting the resulting mixture using a high frequency electric field of at least 300kHz.

3. The method of claim 2 wherein the electrically conductive material is metallic chromium.

4. The method of claim 2 wherein the electrically conductive material is metallic yttrium.

5. The method of claim 2 wherein the electrically conductive material is metallic scandium.

6. The method of claim 2 wherein the electrically conductive material is a chromite having the formula $R_{1-x}Me_xCrO_3$ wherein R is a rare-earth element, yttrium or scandium, Me is an alkali-earth metal, and $x$ equals 0.02 to 0.4.

7. The method of claim 6 wherein the chromite consists essentially of the oxides of lanthanum, calcium, and chromium.

8. The method of claim 6 wherein the chromite consists essentially of the oxides of lanthanum, calcium, strontium, barium, and chromium.

* * * * *